US012054898B2

(12) United States Patent
Satrom et al.

(10) Patent No.: US 12,054,898 B2
(45) Date of Patent: Aug. 6, 2024

(54) SAFETY GATE

(71) Applicant: PS Industries Incorporated, Grand Forks, ND (US)

(72) Inventors: Daniel Thomas Satrom, Arvilla, ND (US); Chad Joseph Rose, Grand Forks, ND (US)

(73) Assignee: PS INDUSTRIES INCORPORATED, Grand Forks, ND (US)

( * ) Notice: Subject to any disclaimer, the term of this patent is extended or adjusted under 35 U.S.C. 154(b) by 0 days.

(21) Appl. No.: 18/150,248

(22) Filed: Jan. 5, 2023

(65) Prior Publication Data

US 2023/0151568 A1 May 18, 2023

Related U.S. Application Data

(63) Continuation of application No. 17/132,384, filed on Dec. 23, 2020, now Pat. No. 11,608,603, which is a continuation of application No. 15/870,342, filed on Jan. 12, 2018, now Pat. No. 10,907,314.

(51) Int. Cl.

*E01F 13/06* (2006.01)
*E05F 1/10* (2006.01)
*E06B 9/02* (2006.01)
*E06B 9/00* (2006.01)

(52) U.S. Cl.

CPC ................ *E01F 13/06* (2013.01); *E05F 1/10* (2013.01); *E06B 9/02* (2013.01); *E06B 2009/002* (2013.01)

(58) Field of Classification Search

CPC ........... E01F 13/06; E05F 1/10; E05F 1/1091; E06B 2009/002; E06B 9/02

See application file for complete search history.

(56) References Cited

U.S. PATENT DOCUMENTS

| | | | |
|---|---|---|---|
| 669,208 | A | 3/1901 | Simons |
| 964,545 | A | 7/1910 | Perritt |
| 2,563,894 | A | 8/1951 | White |
| 3,061,960 | A | 11/1962 | Dull |
| 4,122,629 | A | 10/1978 | Rennick |

(Continued)

OTHER PUBLICATIONS

"Slam-proof Loading Dock Safety Gate," Material Handling Product News, vol. 39, No. 2, Apr. 2017, 1 page.

(Continued)

*Primary Examiner* — Gregory J Strimbu
(74) *Attorney, Agent, or Firm* — Fredrikson & Byron, P.A.

(57) ABSTRACT

Apparatus and methods for assembling, installing, and operating a manually operated gate (e.g., a safety gate) are provided. The manually operated safety gate can include a gate frame and a spring assembly. The gate frame can include a proximal upright member, a distal upright member, an upper arm, and a lower arm. The proximal upright member can be anchored to a stationary surface. The upper arm and lower arm can be pivotably coupled to the proximal upright member and distal upright member to form a parallelogram. The manually operated gate can be configured to pivot between an open position and a closed position at a constant angular velocity. The gate can freely pivot to the closed position from a self-close position. A kit can contain the required structural components and instructions and can be used to assemble the manually operated gate assembly.

21 Claims, 15 Drawing Sheets

(56) References Cited

U.S. PATENT DOCUMENTS

| | | | | |
|---|---|---|---|---|
| 4,438,596 | A | 3/1984 | Jones et al. | |
| 4,576,541 | A | 3/1986 | Dunn et al. | |
| 4,620,393 | A | 11/1986 | Stafset | |
| 4,658,543 | A | 4/1987 | Carr | |
| 4,844,567 | A | 7/1989 | Chalabian | |
| 4,979,603 | A | 12/1990 | Wheatland | |
| 5,271,183 | A | 12/1993 | Hahn et al. | |
| 5,299,386 | A | 4/1994 | Naegelli et al. | |
| 5,343,583 | A | 9/1994 | Cook | |
| 5,440,838 | A | 8/1995 | Lesser | |
| 5,459,963 | A | 10/1995 | Alexander | |
| 5,564,238 | A | 10/1996 | Ellis | |
| 5,649,396 | A | 7/1997 | Carr | |
| 5,671,563 | A | 9/1997 | Marcum | |
| 5,800,016 | A * | 9/1998 | Allred | A61G 5/1059 297/344.17 |
| 5,869,940 | A | 2/1999 | Parsadayan | |
| 5,984,569 | A | 11/1999 | Chou | |
| 5,997,211 | A | 12/1999 | Chou | |
| 6,119,399 | A | 9/2000 | McCain et al. | |
| 6,186,274 | B1 | 2/2001 | Reynolds et al. | |
| 6,611,992 | B1 | 9/2003 | Arnaud | |
| 6,796,084 | B2 | 9/2004 | Gagnon | |
| 6,935,000 | B1 | 8/2005 | Arnaud | |
| 7,739,834 | B2 | 6/2010 | Stoffels et al. | |
| 10,208,440 | B1 | 2/2019 | Honeycutt | |
| 10,907,314 | B2 * | 2/2021 | Satrom | E06B 9/02 |
| 11,608,603 | B2 * | 3/2023 | Satrom | E05F 1/10 |
| 2004/0261319 | A1 | 12/2004 | Kennedy et al. | |
| 2005/0177988 | A1 | 8/2005 | Williams | |
| 2008/0000156 | A1 | 1/2008 | Stoffels et al. | |
| 2011/0271602 | A1 | 11/2011 | Bartole | |
| 2013/0019432 | A1 | 1/2013 | Smith | |
| 2013/0219790 | A1 * | 8/2013 | Honeycutt | E06B 11/04 49/176 |
| 2014/0360680 | A1 | 12/2014 | Bürgin | |
| 2017/0198448 | A1 | 7/2017 | Han | |
| 2017/0328118 | A1 * | 11/2017 | Walling | E06B 9/04 |

OTHER PUBLICATIONS

Guardrite Ex 3 Barrier System brochure of Rite-Hite Aftermarket Corporation, Milwaukee, WI 53224-9520 (unknown date, but at least 2006), 2 pages.

* cited by examiner

SAFETY GATE

RELATED APPLICATIONS

The present application is a continuation of U.S. patent application Ser. No. 17/132,384, filed on Dec. 23, 2020, which is a continuation of U.S. patent application Ser. No. 15/870,342, filed on Jan. 12, 2018, issued as U.S. Pat. No. 10,907,314 on Feb. 2, 2021. The entire contents of each of these applications are incorporated herein by reference.

TECHNICAL FIELD

This disclosure generally relates to manually operated gates.

BACKGROUND

Unsecure loading docks can present safety hazards. Without proper restraints, even with the utmost care, workers, passersby, equipment, and the like can inadvertently cross the threshold of the loading dock leading to a dangerous fall. Loading dock safety gates can provide a helpful barrier to prevent such events. Traditionally, loading dock safety gates can be made of durable material which can result in gates that are heavy and more difficult to operate without unnecessary strain or the assistance of machines.

SUMMARY

In general, several embodiments related to manually operated safety gates are disclosed herein. Such safety gates can provide a barrier to help prevent inadvertent crossing of a loading dock threshold with one handed operation. The manually operated safety gate can be adjustable to fit a variety of loading dock openings. The manually operated safety gate can be configured to have minimal friction between its components. Conventional safety gates can be difficult to move due to pure weight, friction, or other obstacles thus requiring additional equipment and presenting unnecessary safety hazards such as pinch points or other risks associated with automated systems.

The present disclosure provides a manually operated gate that can fit a variety of opening sizes and facilitate easy, one-handed operation. The manually operated gate can have a gate frame and a spring assembly. The gate frame can include a proximal upright member, an upper arm, a lower arm, and a distal upright member. The proximal upright member can be anchored to a stationary surface (e.g., floors, walls, inclines, etc.). In some embodiments, the manually operated gate can include a gate catch to receive the distal upright member. In such cases, the gate catch can be anchored to a stationary surface. Some embodiments can include a distal upright member that is in contact with the floor. As assembled, the upper arm and the lower arm can be pivotably coupled to the proximal upright member and the distal upright member.

The spring assembly can be configured to assist in the operation of the manually operated gate. The spring assembly can be coupled to the gate frame. The spring assembly can be positioned such that it facilitates constant angular velocity as the gate frame pivots from an open position to a closed position. In the open position, the upper arm and lower arm can be substantially vertical. In the closed position, the upper arm and lower arm can be substantially horizontal.

In operation, an operator can move the gate frame for passage through to the other side of the gate. To open the gate, the gate can be pivoted from the closed position to an open position. When the gate is in the open position, the spring assembly can be positioned high and away from the underneath passageway. To close the gate, the gate can be pivoted from an open position to or past a self-close position. The gate can be configured so as to freely close itself from the self-close position to the closed position. As the gate pivots, it can move at a constant angular velocity as controlled by the spring assembly.

Methods of assembling/installing a manually operated gate are discussed herein. In some embodiments, the method can include selecting a width for a gate from among multiple possible widths. The method can include assembling the gate. Assembling the gate may include adjusting a length of upper and lower arms in accordance with the width of the gate. Assembling the gate may include assembling a gate frame by pivotably coupling the upper and lower arms to a proximal upright member and a distal upright member to form a parallelogram. Assembling the gate may include coupling a spring assembly to the gate frame. Assembling the gate may include anchoring the proximal upright member to a stationary surface. The method can include manually causing the gate frame to pivot between an open position in which the upper and lower arms are generally vertical and a closed position in which the upper and lower arms are generally horizontal. The spring assembly may be configured to assist movement of the gate frame between the open position and the closed position. In some embodiments (e.g., FIGS. 1-7, discussed in greater detail elsewhere herein), the gate frame includes only two spring assembly coupling connections. In some such embodiments, coupling the spring assembly to the gate frame can comprise coupling the spring assembly to the two spring assembly coupling connections irrespective of which of the multiple possible widths is selected. In some embodiments, the spring assembly is configured to maintain movement of the gate frame from a self-close position to the closed position at a generally constant angular velocity.

Many embodiments of the presently disclosed manually operated gate offer several advantages over conventional safety gates. One gate assembly can be adjusted to cover multiple loading dock openings. The counterbalanced design of the gate can allow for easy, one-handed operation without unnecessary strain or additional equipment. The spring assembly can prevent unintended slamming of the gate frame and allow for smooth gate operation. The placement of the spring assembly being high and away can help prevent potential damage from passersby, equipment such as pallets, or operating equipment such as forklifts. Additionally, the manually operated gate can be in the open position without having any pinch points. In many cases, installation methods discussed herein can achieve a pre-tensioned spring without an installer having to manually pre-tension the spring.

The details of one or more examples are set forth in the accompanying drawings and the description below. Other features, objects, and advantages will be apparent from the description and drawings.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Figure 1:
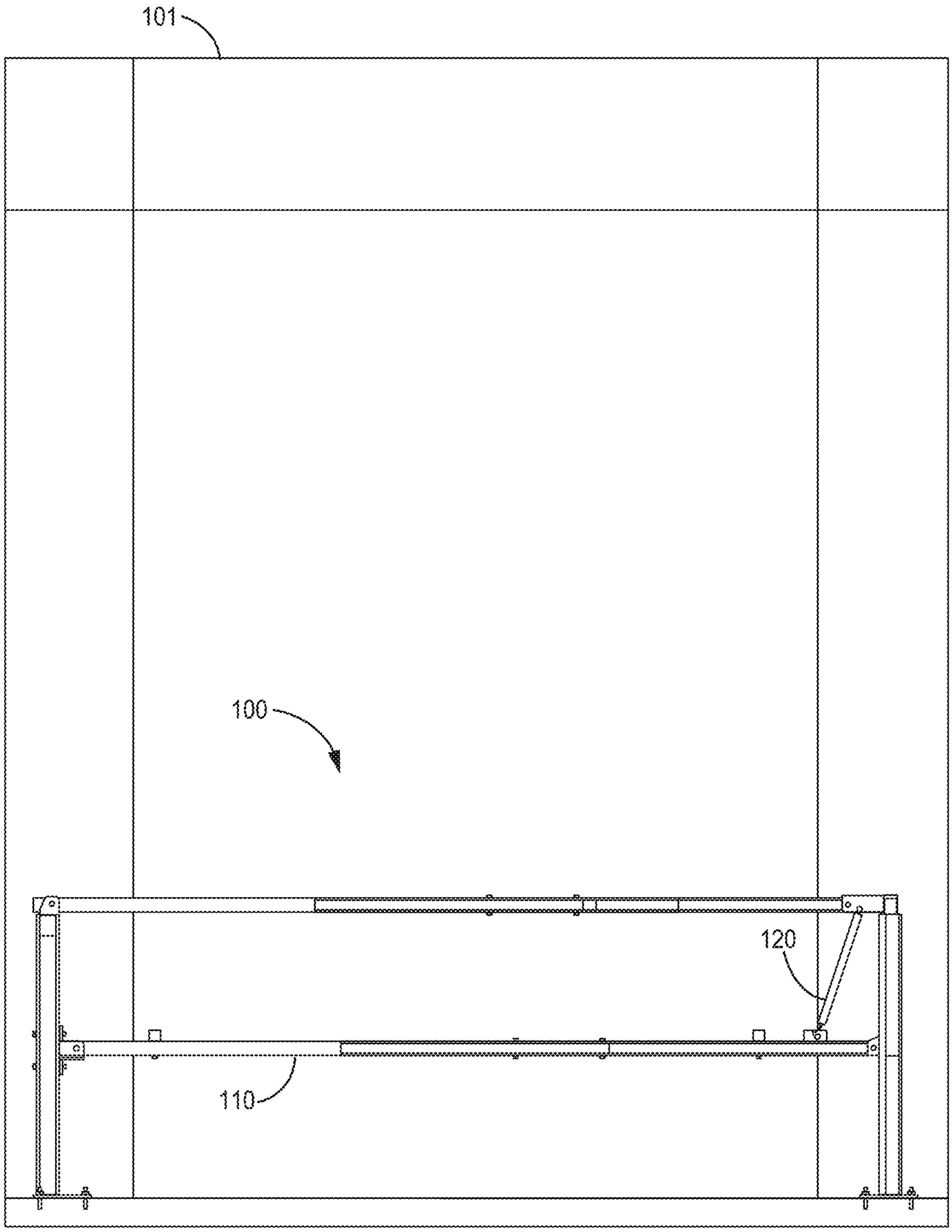
FIG. 1 is a schematic, side elevational view of a manually operated gate installed on a standard dock.

FIG. 1 shows an illustrative manually operated gate 100 installed on a standard loading dock 101. The manually operated gate can include a gate frame 110 and a spring assembly 120. The gate frame 110 can be configured to span openings for, e.g., loading and unloading, passage, and containment. The spring assembly 120 can facilitate easy operation of the manually operated gate 100. The manually operated gate 100 can be assembled such that minimal force is required to open and close the manually operated gate 100 during operation and can be adapted to be used in multiple platforms. Although gate features described herein are discussed with reference to loading dock safety gates, many of such features would also be applicable in other safety gates, livestock gates, traffic gates, machine guarding gates, crowd control gates, etc.

Figure 2:
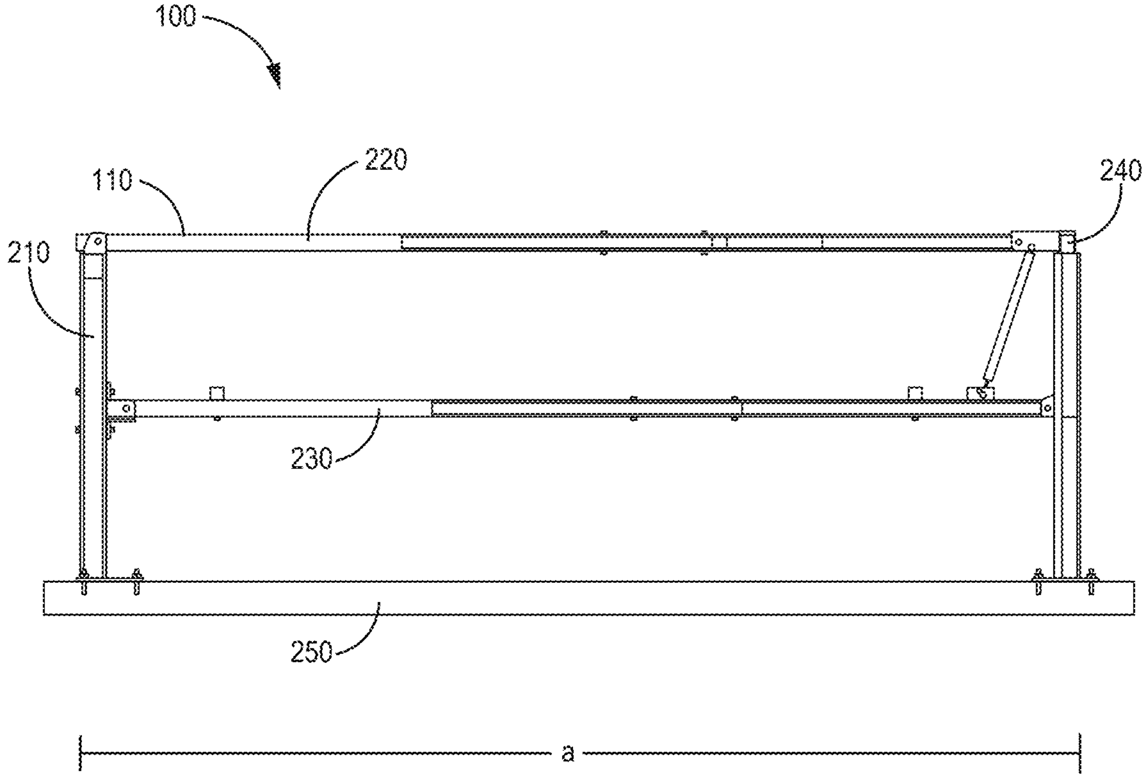
FIG. 2 is a side elevational view of a manually operated gate at a first width in a closed position.

FIG. 2 shows a manually operated gate 100 in a closed position at a first width, a, which may correspond to the width of a standard loading dock opening (e.g., 8 feet). The gate frame 110 can include a proximal upright member 210, an upper arm 220, a lower arm 230, and a distal upright member 240. The proximal upright member 210 can be anchored to a stationary surface 250. As shown, the stationary surface 250 is a floor. In some embodiments, the stationary surface can be a floor or deck, a wall, an incline, or any other surface that can serve as an anchor for the proximal upright member 210. In some instances, the proximal upright member 210 can be mechanically affixed to the stationary surface using a bracket. Anchoring the proximal upright member 210 to the stationary surface can include welding, setting in concrete, or fastening or anchoring operations.

The upper arm 220 and the lower arm 230 can be coupled to the proximal upright member 210 and the distal upright member 240 to form a parallelogram. The upper arm 220 and the lower arm 230 can be pivotable relative to the proximal upright member 210 and the distal upright member 240. Though depicted towards the distal end of the upper arm 220 and lower arm 230 relative to the proximal upright member 210, a distal upright member can be placed at a more proximal position. For instance, the distal upright member 240 can be placed at or around the middle of the upper arm 220 and lower arm 230. Some embodiments may include more than one distal upright member.

Figure 3:
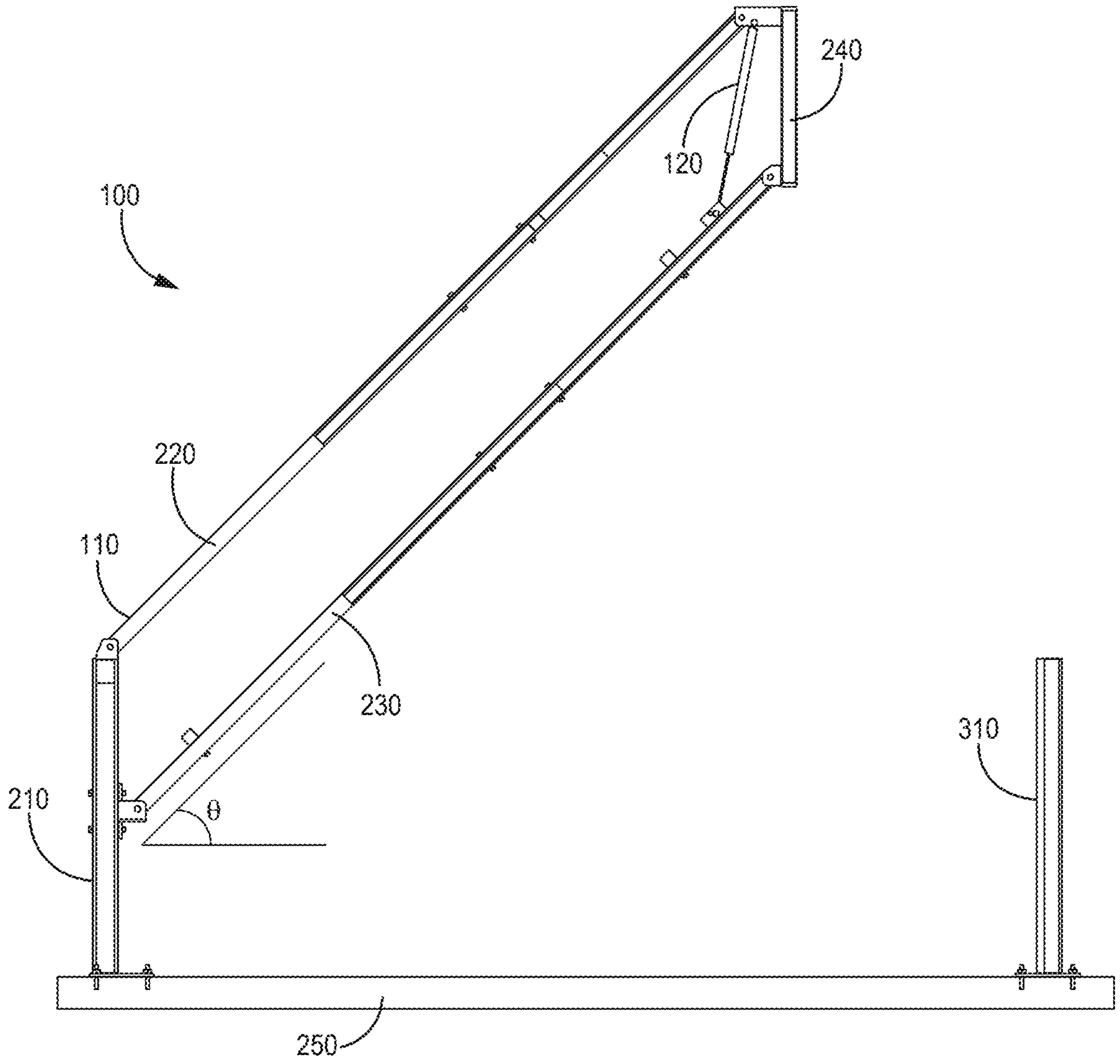
FIG. 3 is a side elevational view of a manually operated gate at a first width in a partially open position.

The movement of the gate frame 110 can be guided by several components of the manually operated gate 100 as shown in FIG. 3. The manually operated gate 100 can include a gate catch 310. The gate catch 310 can be anchored to the stationary surface 250. The gate catch 310 can be configured to receive the distal upright member 240 when the gate frame 110 is in a closed position. The gate catch 310 can be configured so as to be stationary relative to the distal upright member 240. The gate catch 310 can be configured to be attachable to the distal upright member 240. In such cases, the gate catch 310 can extend to be in contact with the stationary surface 250 when the manually operated gate 100 is in the closed position. In some embodiments, the gate catch can be a relatively small bracket or stopper that extends only a short distance from the floor. Some gate embodiments may lack a gate catch. In some such embodiments, the distal upright member may extend below the lower arm 230 all the way to the floor.

The stationary surface 250 can vary across different embodiments. In some embodiments, the gate catch 310 and the proximal upright member 210 can be anchored to the same stationary surface 250 (e.g., a deck or floor). However, in other embodiments, the gate catch 310 and the proximal upright member 210 may not be anchored to the same stationary surface 250 (e.g., a wall and a deck). It is possible for the stationary surfaces 250 to be at different angles relative to one another. Thus, any number of combinations for anchoring the manually operated gate 100 is possible.

Movement of the manually operated gate can be guided by a spring assembly 120. The spring assembly 120 can be configured to assist movement of the gate frame 110 from the closed position to the open position. The spring assembly 120 can be coupled to the gate frame 110. In some embodiments, the spring assembly 120 can be coupled to the lower arm 230 of the gate frame and the distal upright member 240 of the gate frame 110. In some embodiments, the spring assembly 120 can be coupled to the upper arm 220 of the gate frame and the distal upright member 240. In some embodiments, the spring assembly 120 can be coupled to the upper arm 220 and/or the lower arm 230 and to the proximal upright member 210. Embodiments of the manually operated gate can include a spring assembly coupled to any components of the gate frame to achieve the spring-assist opening and controlled closing described herein. The spring assembly 120 in some embodiments can be positioned closer to the distal upright member 240 than to the proximal upright member 210. In some embodiments, the spring assembly 120 can be positioned closer to the proximal upright member 210 than to the distal upright member 240.

Pivoting the upper arm 220 and lower arm 230 can move the gate frame 110 between an open position (FIG. 4) and a closed position (FIG. 2). In the closed position, the upper arm 220 and the lower arm 230 can be generally horizontal. In the open position, the upper arm 220 and the lower arm 230 can be generally vertical. The spring assembly 120 can be configured to hold the upper arm 220 and the lower arm 230 generally vertically when the gate frame 110 is in the open position. Since the spring assembly 120 causes the gate frame 110 to move at a constant angular velocity, it can minimize risk of abrupt closures or openings.

The manually operated gate 100 can be configured to close safely on its own from certain angles. The spring assembly 120 can be configured to maintain movement of the gate frame 110 from a self-close position to the closed position at a generally constant angular velocity. The self-close position can be described with reference to an angle, θ, between the upper and lower arms 220, 230 and the horizontal. When the gate frame 110 is in the open position, θ is 90° or close thereto. When the gate frame 110 is in the closed position, θ is 0° or close thereto.

For instance, if the proximal upright member 210 is anchored to a floor and the lower arm 230 is perpendicular to the proximal upright member when the gate frame is in the closed position, the self-close position can be at a location between the open position and closed position of the gate frame 110. The manually operated gate 100 can be assembled such that the self-close position can be adjustable or at different angles for different gate configurations. In various embodiments, the gate frame can be in the self-close position when θ is various angles. In some embodiments, the gate frame can be in the self-close position when θ is approximately 45°. In some embodiments, the gate frame can be in the self-close position when θ is approximately 55°. In some embodiments, the gate frame can be in the self-close position when θ is approximately 65°. In some embodiments, the gate frame can be in the self-close position when θ is approximately 75°. In some embodiments, the gate frame can be in the self-close position when θ is between 70° and 80°. When a user manually pivots the gate frame 110 from the open position to the self-close position or past the self-close position, the user may let go of the gate frame 110 and allow the gate frame to continue pivoting to the closed position at an angular velocity that is constant or close thereto.

The gate frame 110 can be connected in such a way as to minimize friction at pivot points. The gate frame 110 can be coupled together using flange bearings (e.g., plastic, bronze) between components which can minimize friction in the connection. Frictionless connections allow for the gate frame 110 to pivot with a low amount of force needed by a gate operator. Thus, the manually operated gate 100 can be designed such that minimal to no friction is introduced or required between, for instance, the proximal upright member 210 and the coupled upper arm 220 and lower arm 230. Such connections can allow for or assist the gate frame 110 to maintain a constant angular velocity when pivoting from the self-close position to the closed position.

The spring assembly 120 can take various forms to accomplish the designed function. In some embodiments, the spring assembly 120 can include a fluid spring. In some such embodiments, the spring assembly 120 can be gas or hydraulic. In some embodiments, the spring assembly 120 can include a mechanical spring (e.g., a steel coil spring). The spring assembly 120 can be configured to provide appropriate forces to the gate frame 110 for operation. For example, the spring assembly 120 can include one or more springs in tension, compression, torsion, or any other similar configuration. In some embodiments, the spring assembly 120 can include one component for achieving the spring-assist opening described herein and a separate, independent component (e.g., a damper) for achieving the controlled closing described herein.

Figure 4:
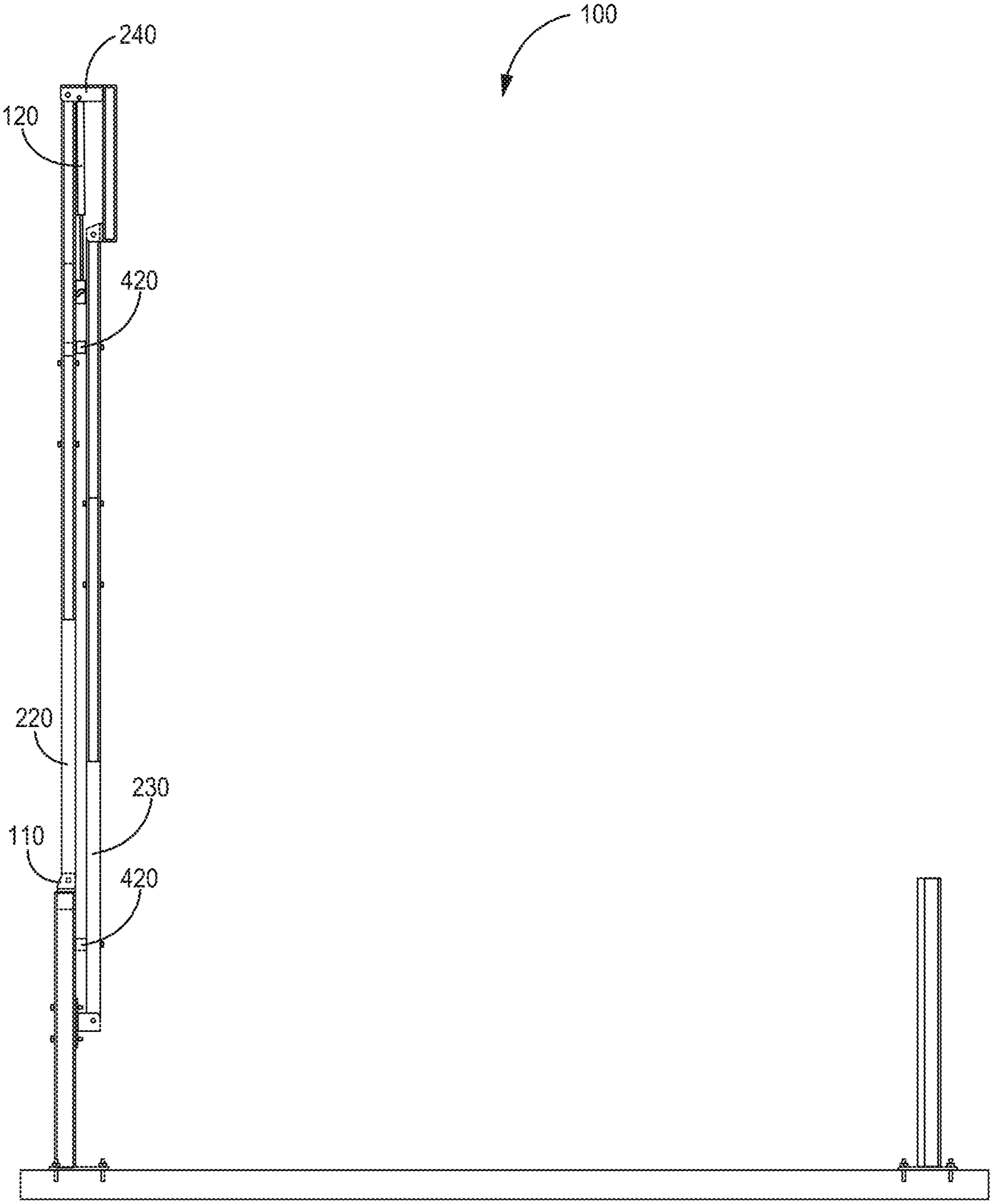
FIG. 4 is a side elevational view of a manually operated gate at a first width in an open position.
Figure 5A:
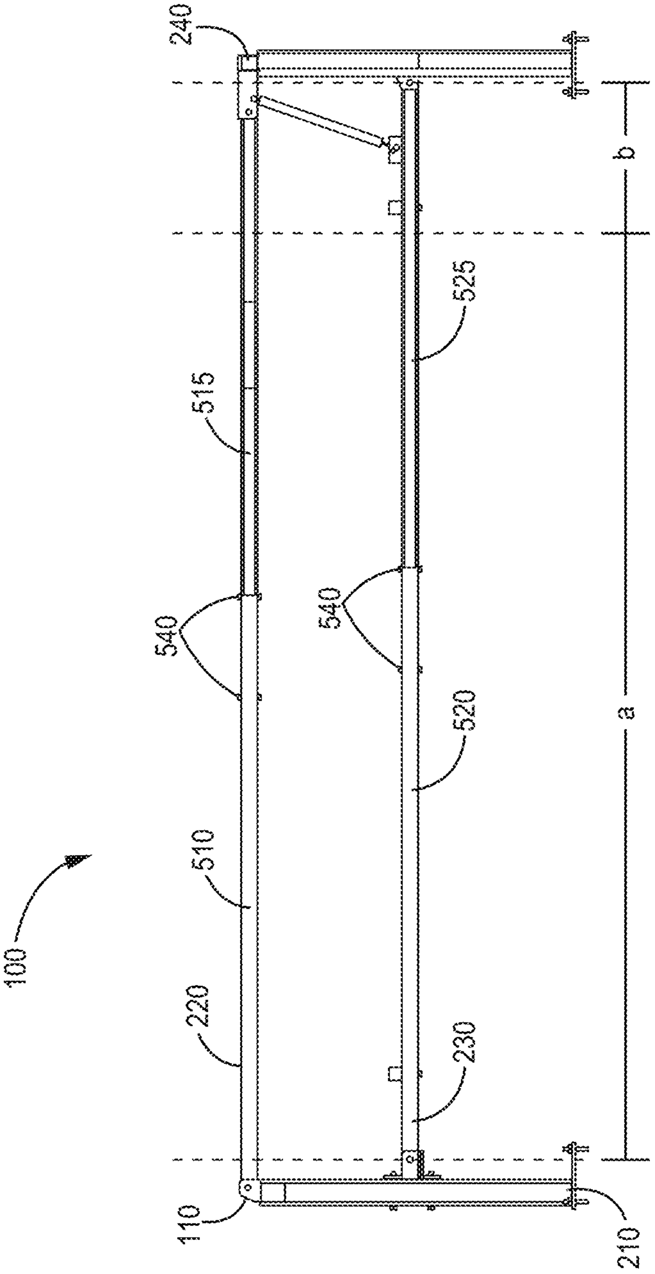
FIG. 5A is a side elevational view of a manually operated gate at a second width extended a distance, b, in a closed position.
Figure 5B:
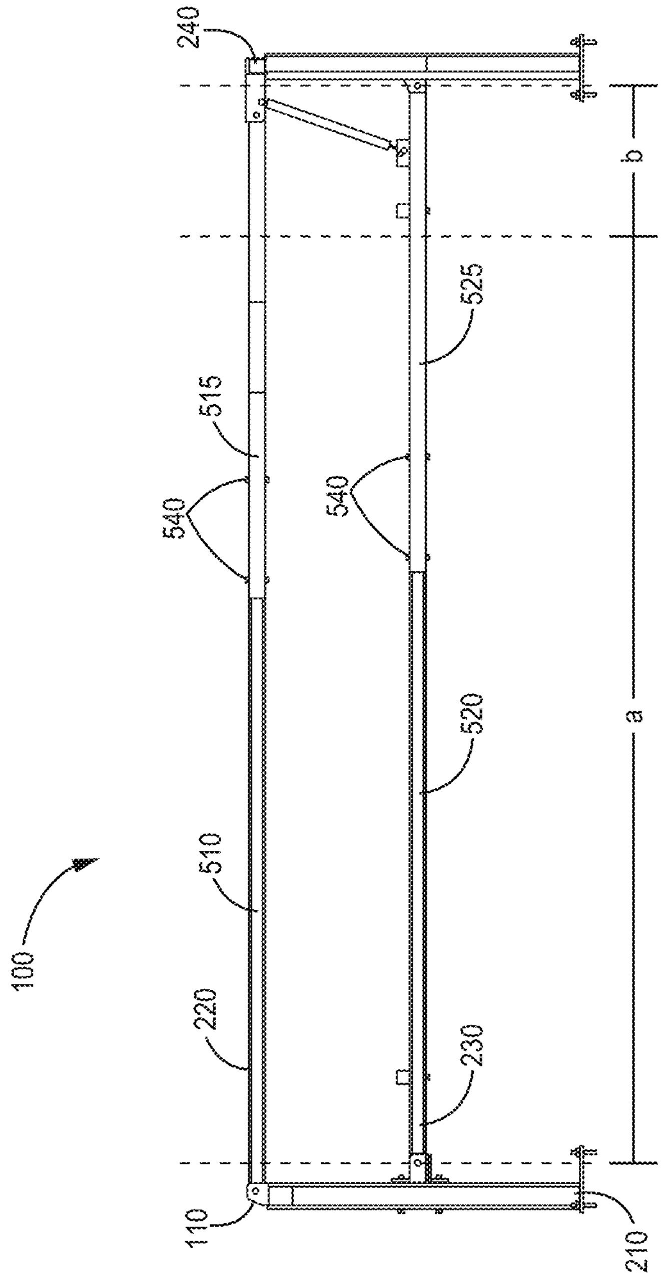
FIG. 5B is a side elevational view of a manually operated gate at the second width extended a distance, b, in a closed position.
Figure 6:
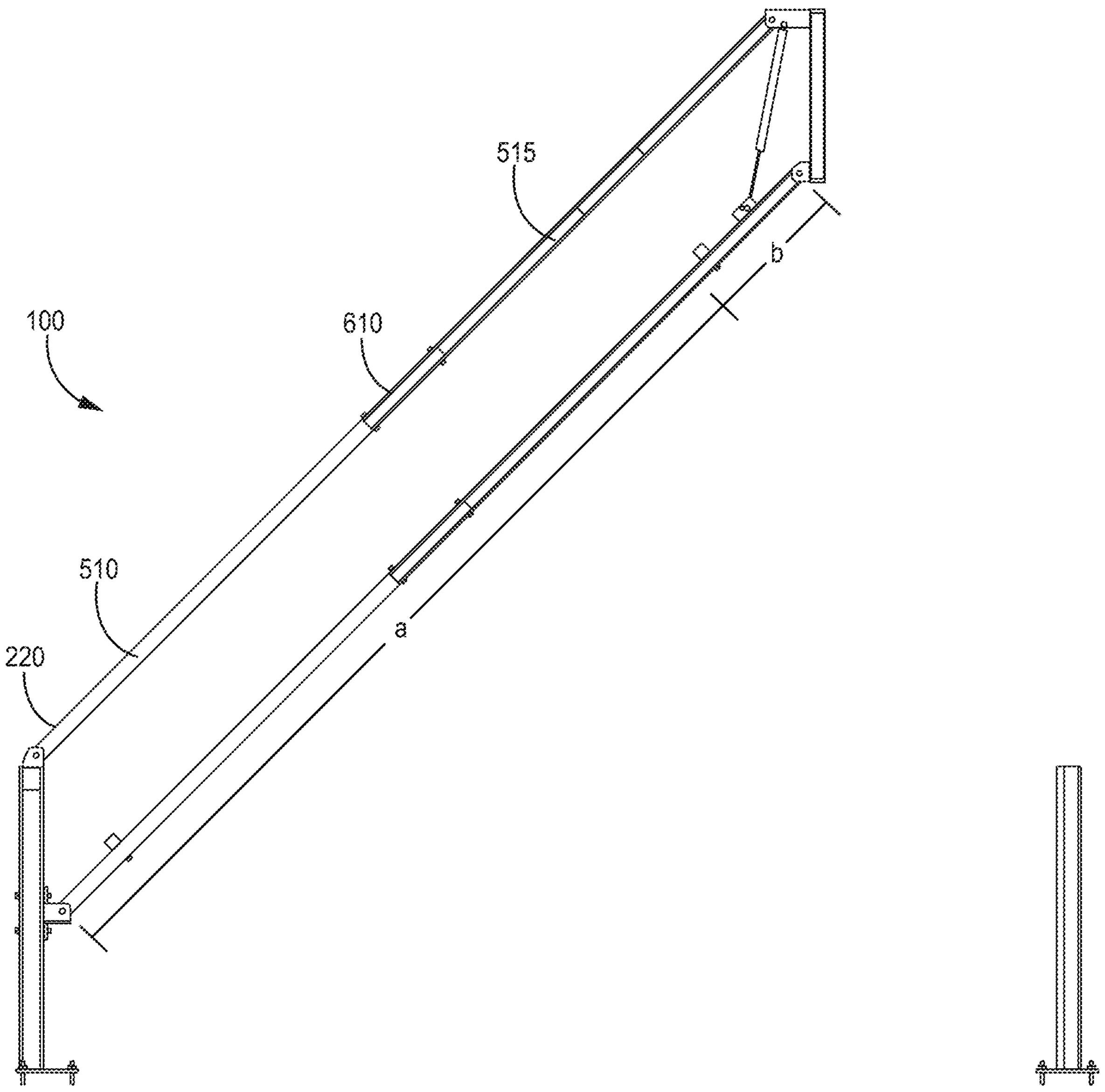
FIG. 6 is a side elevational view of a manually operated gate at a second width in a partially open position.
Figure 7:
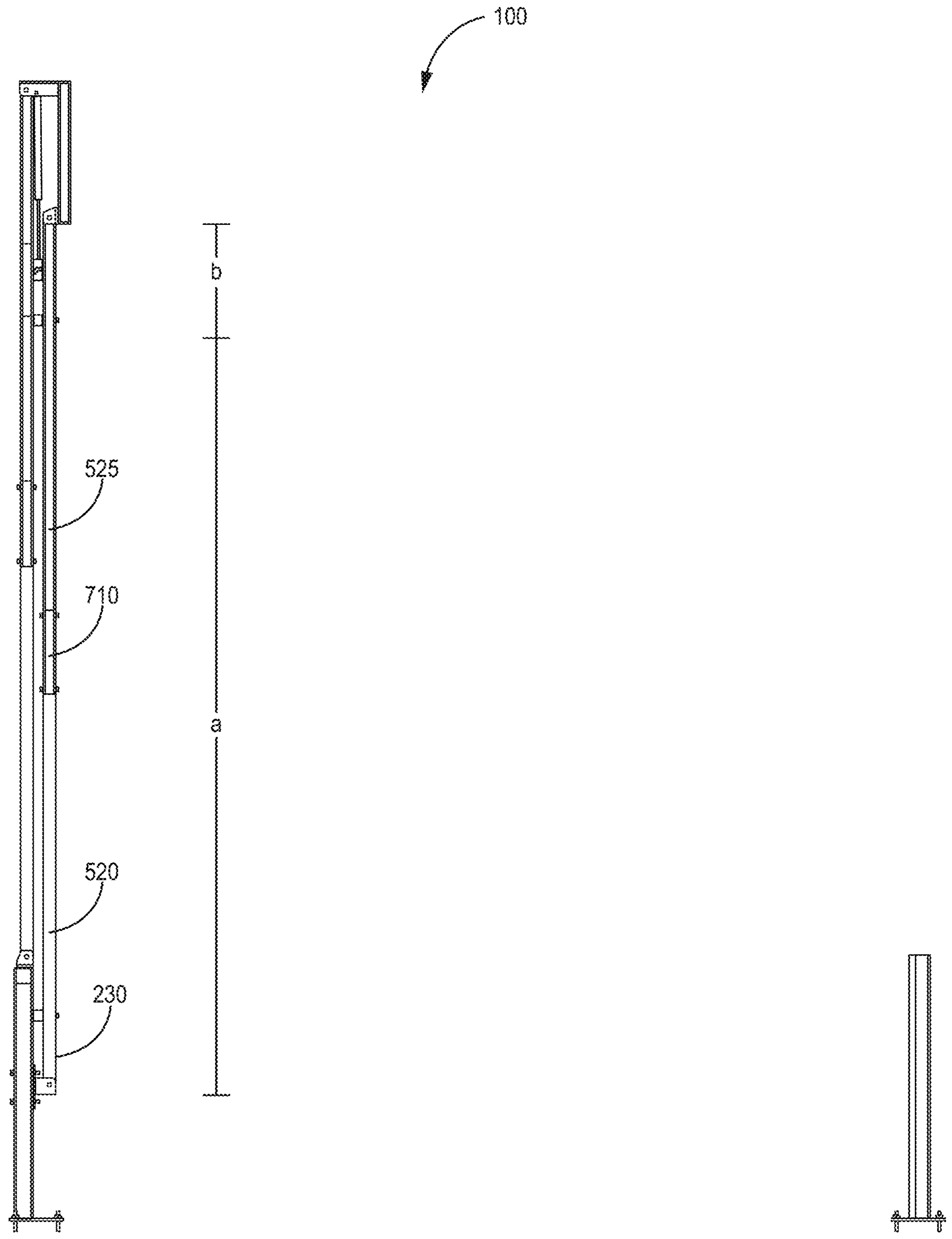
FIG. 7 is a side elevational view of a manually operated gate at a second width in an open position.

The manually operated gate 100 can be constructed in such a way that it minimizes safety hazards during operation as illustrated in FIG. 4. When the manually operated gate 100 is in the open position, the gate frame 110 can be vertically positioned such that it substantially fits within the footprint of the proximal upright member 210. Such a position can minimize space required for installation and ensure that the gate frame 110 is substantially positioned outside of the traffic area (e.g. tucked behind the frame of the opening). The spring assembly 120 can be situated high and away from objects passing by. For example, the vertical location of the spring assembly 120 can be high enough to avoid machines (e.g. forklifts) and passersby. The upper arm 220, lower arm 230, proximal upright member 210, and distal upright member 240 can be configured to prevent pinch points during any point in operation. Rubber bumpers 420 can be configured to ensure sufficient spacing between components as well. Since the spring assembly 120 helps control movement of the gate, it can minimize risk of abrupt closures or openings.

The manually operated gate 100 can be assembled to extend to additional lengths as shown in FIGS. 5A-7. Loading stations typically come in a variety of standard sizes. The manually operated gate 100 can be adjustable to span a wide array of standard loading station sizes. As shown, the manually operated gate 100 is adjusted to a second width that is extended a distance b beyond the distance of the first width, a. The manually operated gate 100 can be adjustable to, for example, 8 feet, 10 feet, or 12 feet. In some embodiments, the manually operated gate can be adjusted between larger or smaller increments (e.g. inches or increments thereof) and/or to larger or smaller lengths.

Illustrative embodiments of the gate frame 110 can be adapted to adjust to multiple widths as shown in FIGS. 5A-7. The upper arm 220 can include an upper main arm 510 and an upper arm extension 515. The upper main arm 510 can be coupled to the proximal upright member 210. The upper arm extension 515 can be coupled to the distal upright member 240. The lower arm 230 can include a lower main arm 520 and a lower arm extension 525. The lower arm extension 525 can be coupled to the distal upright member 240. The lower arm extension 525 can be coupled to the distal upright member 240. The upper arm 220 can be adjustable to multiple widths. The upper arm 220 can include an upper arm overlap portion 610. The upper main arm 510 can fit within the upper arm extension 515 (e.g., FIG. 5B). The upper arm extension 515 can fit within the upper main arm 510 (e.g., FIG. 5A). In some embodiments, there can be more than one upper arm extension 525. The lower arm 230 can be adjustable to multiple widths. The lower arm 230 can include a lower arm overlap portion 710. The lower main arm 520 can fit within the lower arm extension 525 (e.g., FIG. 5B). The lower arm extension 525 can fit within the lower main arm 520 (e.g., FIG. 5A). In some embodiments, there can be more than one lower arm extension 525.

Components of the gate frame can fit within one another and be assembled together in a variety of ways. For instance, the outer profile of the upper arm components and the lower arm components can assume a variety of shapes (e.g., square, v-shaped, etc.). In some such embodiments, the arm components can be nested together or otherwise fastened alongside one another. In some embodiments, the main portions and the geometry of their respective extensions can be complementary so as to fit within each other. Adjustments between the main portions and their respective extensions can be accomplished through a variety of mechanical applications (e.g. fastening, hydraulics, telescoping, etc.). Methods of fastening can be adapted to accommodate the assembly of the upper arm and lower arm.

Figure 8B:
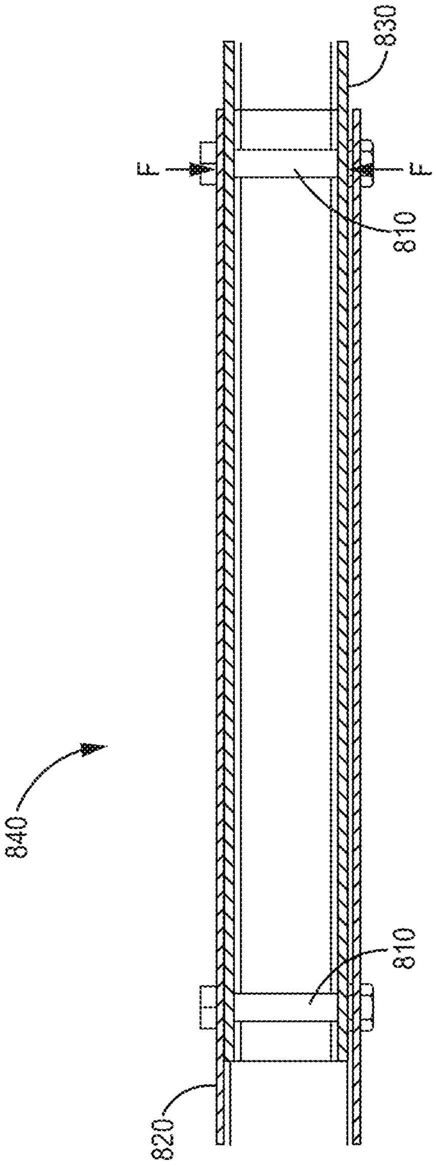
FIG. 8B is a cross-sectional view of an upper arm and an upper arm extension fastened together in an upper arm overlap portion taken at section 8B-8B in FIG. 8A.
Figure 8A:
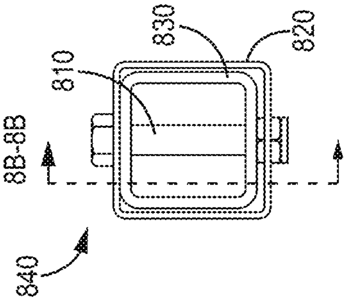
FIG. 8A is a front elevational view of a main arm and an arm extension fastened together in an upper arm overlap portion.
Figure 9A:
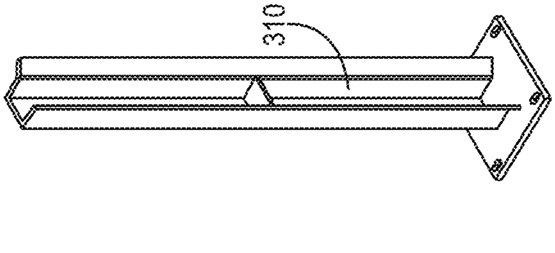
FIGS. 9A-9H are perspective views of parts included in a manually operated gate kit.
Figure 9B:
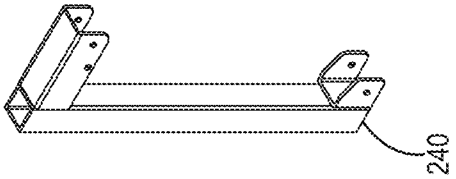
Figure 9C:
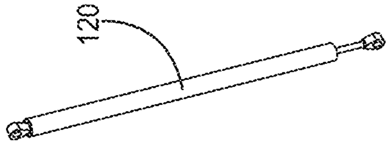
Figure 9D:
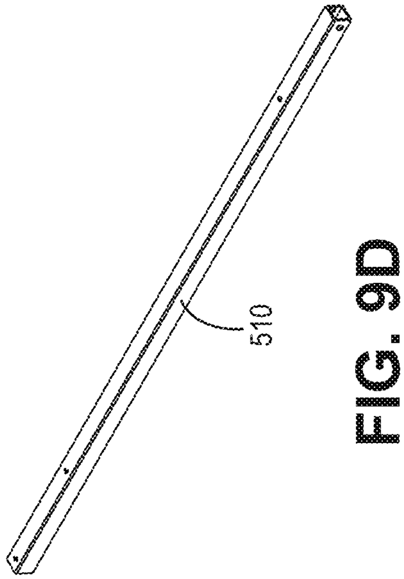
Figure 9E:
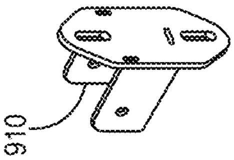
Figure 9F:
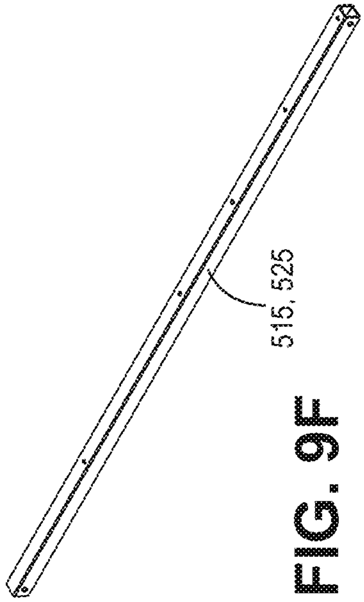
Figure 9G:
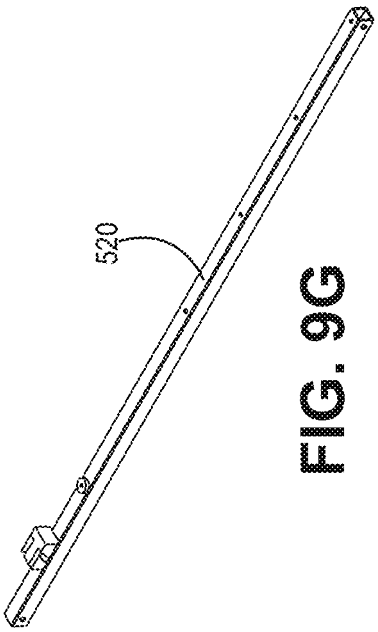
Figure 9H:
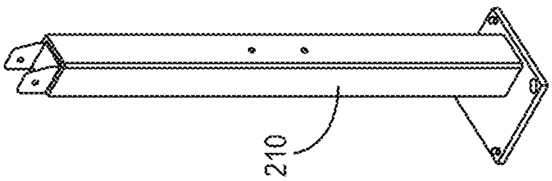

The upper arm and lower arm can be fastened to their respective extensions as illustrated in FIGS. 8A-8B. The gate frame can include an arm fastener 810 (e.g., for the upper and lower arms—see arm fasteners 540 in FIG. 5A). The arm fastener 810 can be configured to fasten a main arm 820 and an arm extension 830 together in an arm overlap portion 840. The arm fastener 810 can apply force, F, directly to an outer surface of the main arm 820 and to an opposed outer surface of the arm extension 830. One or more such arm fasteners 810 can be used to fasten an upper main arm to an upper arm extension and/or a lower main arm to a lower arm extension.

Many embodiments can have the upper arm and lower arm configured to be extended in such a way as to ensure a tight fit. For instance, force can be applied directly to both sides of the outer surface of the inner arm. Fasteners can be positioned such that at least one end of the fastener can be wedged into oversized holes. Fasteners can include, for instance, one or multiple nut and bolt combinations, clamps that can be easily adjustable (e.g., c clamps or clamp bolts), or any other similar parts. When assembled, there can be minimal to no “slop” between the mating pieces.

In some embodiments, a manual gate assembly can include the components shown in FIGS. 9A-9H. The components in FIGS. 9A-9H can form the primary structure of the manually operated gate. There can be a proximal upright member 210, a distal upright member 240, an upper arm comprising an upper main arm 510 and/or one or more upper arm extensions 515, and a lower arm comprising a lower main arm 520 and/or one or more lower arm extensions 525. The one or more upper arm extensions 515 and the one or more lower arm extensions 525 can be identical or distinguishable. The primary structure of the manually operated gate can include a clevis 910, a gate catch 310, and a spring assembly 120.

Figure 10A:
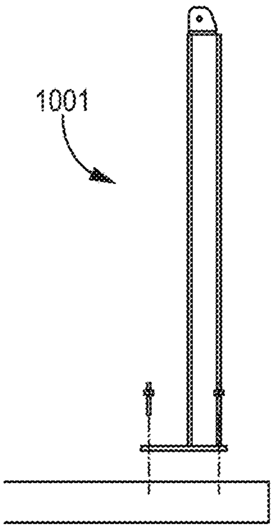
FIGS. 10A-10H illustrate steps 1-8 for assembling a manually operated gate.
Figure 10B:
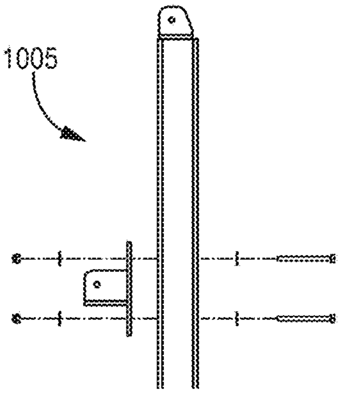
Figure 10C:
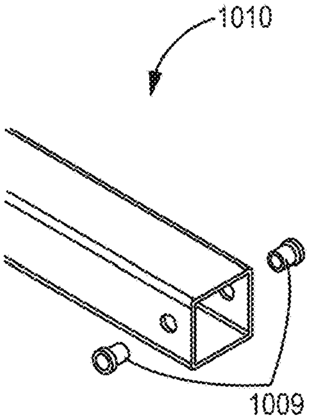
Figure 10D:
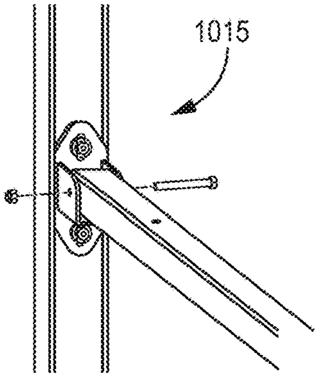
Figure 10E:
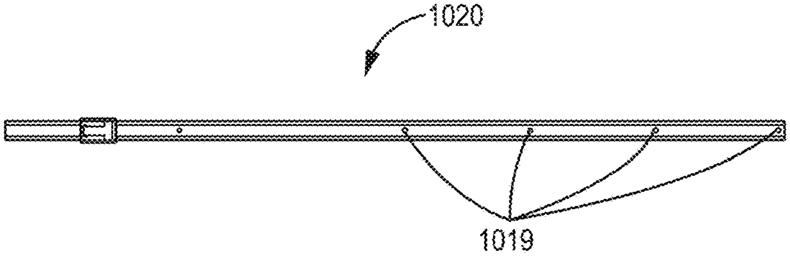
Figure 10F:
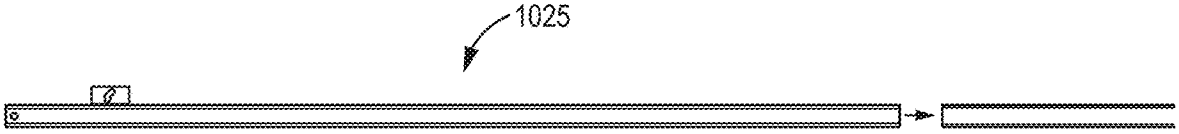
Figure 10G:
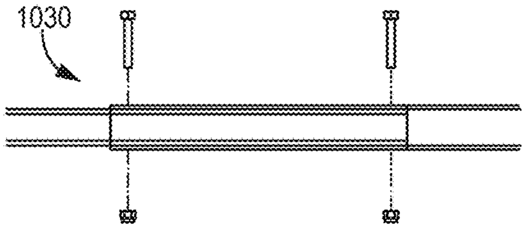
Figure 10H:
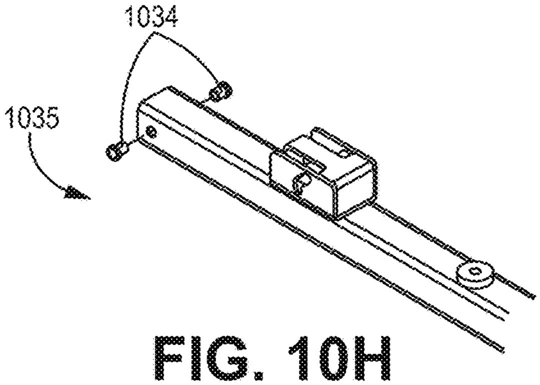
Figure 10I:
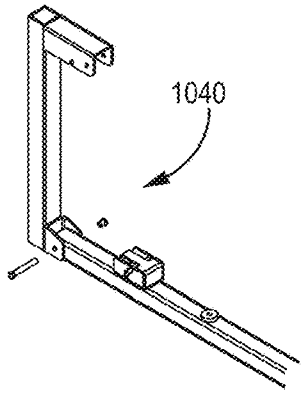
FIGS. 10I-10R illustrate steps 9-16 for assembling a manually operated gate.
Figure 10J:
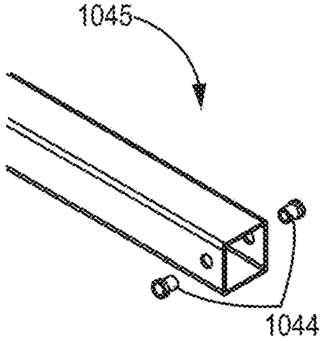
Figure 10K:
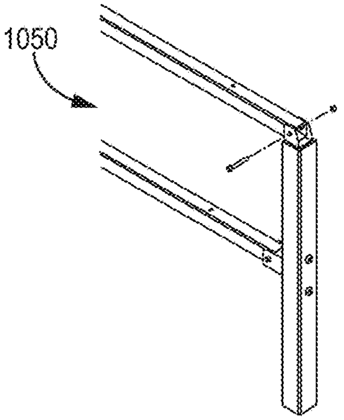
Figure 10L:
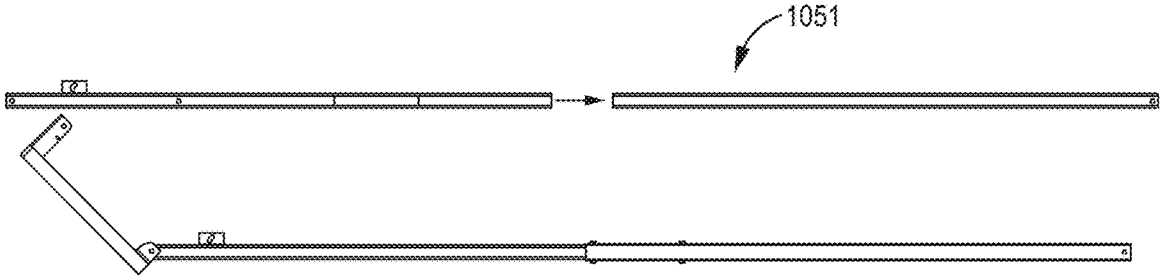
Figure 10M:
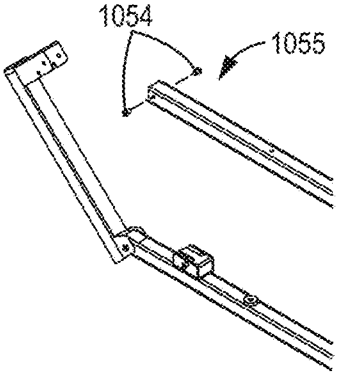
Figure 10N:
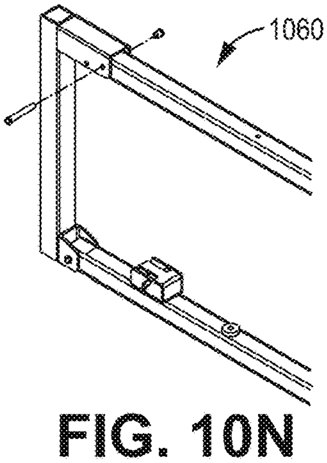
Figure 10O:
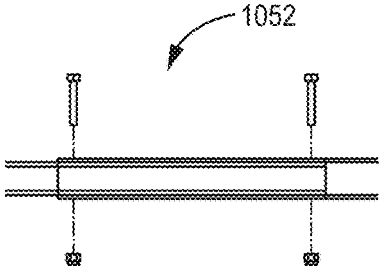
Figure 10P:
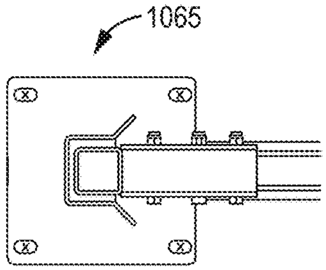
Figure 10Q:
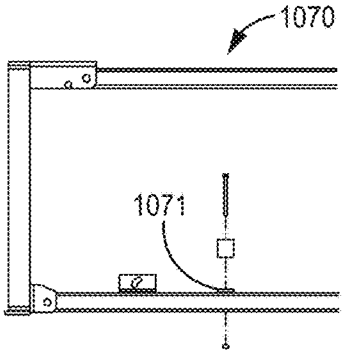
Figure 10R:
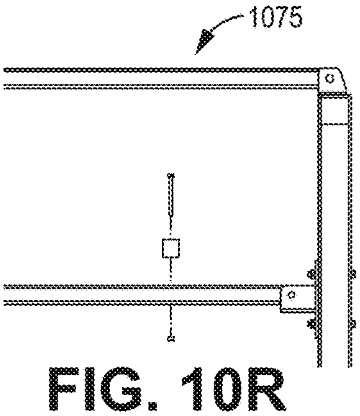
Figure 10S:
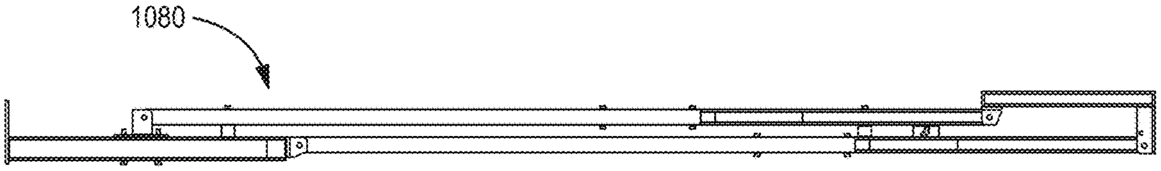
FIGS. 10S-10Y illustrate steps 17-23 for assembling a manually operated gate.
Figure 10T:
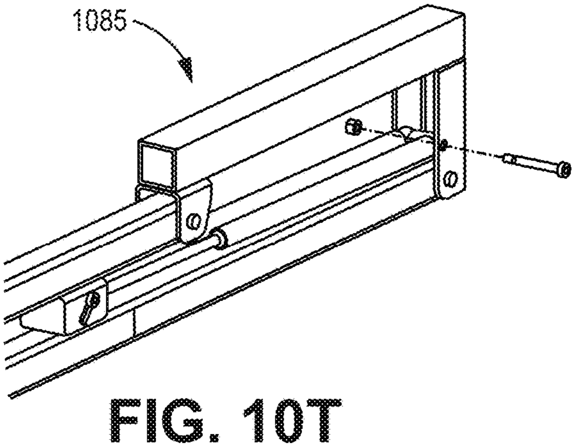
Figure 10U:
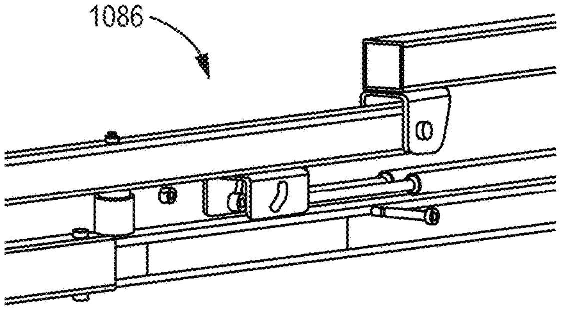
Figure 10V:
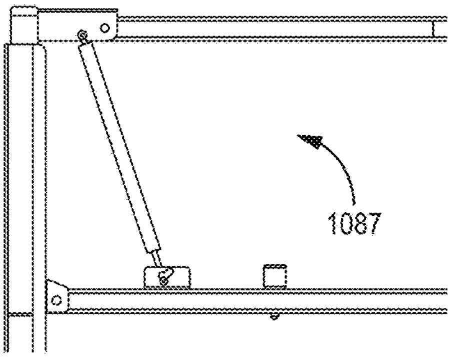
Figure 10W:
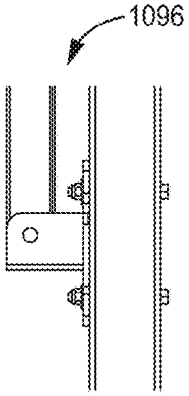
Figure 10X:
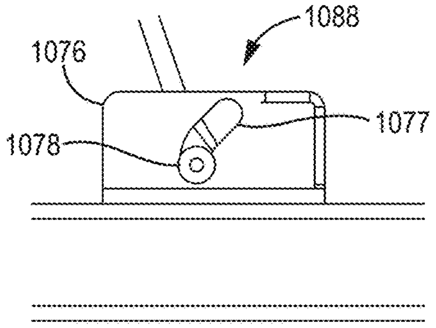
Figure 10Y:

The manually operated gate can be assembled using the steps illustrated in FIGS. 10A-10Y. Assembly can begin by anchoring the proximal upright member 1001. To assemble the gate, holes in the proximal upright member can be marked on the stationary surface and the proximal upright member then anchored to the stationary surface. The base plates of the proximal upright member can be slotted to allow adjustments for alignment. A clevis for coupling the lower arm to the proximal upright member can be attached to the proximal upright member 1005. The clevis can be adjustable.

Referring to FIGS. 10A-10H, after anchoring the proximal upright member 1001 and fastening the adjustable clevis to the proximal upright member 1005, the lower arm can be coupled to the proximal upright member and adjusted to a desired length. Flange bearings 1009 can be installed into both sides of the lower arm where it attaches pivotably to the proximal upright member 1010. The lower arm can then be fit within the clevis and the lower arm coupled to the proximal upright member 1015. The lower arm and upper arm can have pre-drilled holes 1019 for standard opening sizes to be selected 1020 such as 8 feet, 10 feet, and 12 feet. The lower arm can be adjusted to the desired length by creating an overlap portion in fitting the lower arm extension within the lower arm main portion or fitting the lower arm main portion within the lower arm extension 1025. After adjusting the lower arm, the lower arm main portion and the lower arm extension can be fastened together by inserting a fastener into mating holes of the lower arm main portion and the lower arm extension 1030.

As illustrated in FIGS. 10A-10H, with the lower arm coupled to the proximal upright member, the lower arm can then be attached to the distal upright member, and the upper arm can be coupled to the proximal upright member and the distal upright member. Flange bearings 1034 can be installed in the distal end of the lower arm 1035. Referring now to FIGS. 10I-10R, the distal end of the lower arm can then slide into mating components of the distal upright member. At this point, the distal upright member can be pressed against the lower arm and coupled to the distal upright member 1040. Flange bearings 1044 can be installed into the proximal end of the upper arm 1045 and the upper arm coupled to the proximal upright member at that time 1050.

The assembly of the gate frame can continue by adjusting the upper arm by inserting the upper arm extension into the upper main arm with a force. Then, the upper arm extension can be coupled to the upper main arm 1052. The upper arm can be adjusted to the desired length by creating an overlap portion in fitting the upper arm extension within the upper main arm or fitting the upper main arm within the upper arm extension. After adjusting the upper arm, the upper main arm and the upper arm extension can be fastened together by inserting a fastener into mating holes of the upper main arm and the upper arm extension 1052. Then, flange bearings 1054 can be installed in into the distal end of the upper arm 1055 and the upper arm coupled to the distal upright member thereafter 1060.

With the gate frame assembled, the gate catch can be anchored and the gate assembly prepared for installation of the spring assembly. Holes for the gate catch can be marked, x, and the gate catch anchored to a stationary surface 1065. The holes in the base plate of the gate catch can be slotted to allow adjustment for alignment, for instance, to have enough spacing between the distal upright member and the gate catch to minimize interference during operation. Then, at least one bumper can be attached to the lower arm 1070, 1075. The lower arm can have an installation surface for the bumper to ensure proper alignment for operation 1071. Proper assembly of the at least one bumper can include torquing to a predetermined level so as to not deform the at least one bumper during installation.

The gate frame can be configured to assist in the installation of the spring assembly as shown in FIGS. 10S-10Y. The gate frame can include a spring assembly bracket 1076. The spring assembly bracket can be configured to be coupled to the spring assembly. The spring assembly bracket 1076 can have an installation section 1077 and an operation section 1078. The spring assembly bracket 1076 can be configured to allow for manual adjustment of the spring assembly within the spring assembly bracket 1076. The spring assembly bracket 1076 can be configured to minimize forces exerted by the spring assembly during installation, thereby making installation easier.

The spring assembly can now be coupled to the gate frame. The proximal upright member can be unanchored and the gate frame can be laid on a horizontal surface in the open position to improve access to install the spring assembly 1080. The lower arm can include the spring assembly bracket 1076. The first end of the spring assembly can be coupled to the distal upright member 1085 and the opposite end of the spring assembly coupled to an installation section of the spring assembly bracket 1086. The spring assembly can be fully extended, with little or no preload, when first introduced to the gate frame and the installation section of the spring assembly bracket. Now, the proximal upright member can be anchored to the stationary surface again and the gate frame pivoted into the gate catch 1087.

Final steps of assembly can include adjusting the gate assembly for proper alignment. As the gate frame pivots into the gate catch, the spring assembly should self-set from the installation section of the spring assembly bracket to the operation section of the spring assembly bracket 1088. In some embodiments, the spring assembly may not self-set. In such embodiments, the spring assembly can be manually adjusted in the spring assembly bracket, for instance, using a screwdriver and mallet to tap the spring assembly into place. With the spring assembly loaded and in the operation section of the spring assembly bracket, the spring assembly can assist in opening of the gate and provide safe, controlled closing, as discussed herein. The gate frame can then be pivoted into the open position 1095. Vertical alignment of the gate frame can be adjusted by loosening the clevis from the proximal upright member and adjusting the gate frame to a substantially vertical position 1096. The clevis can be tightened to the proximal upright member at that point.

Some embodiments can include a kit for assembling and installing a manually operated gate assembly as described herein. The kit can include components of the gate frame, spring assembly, the required hardware for installation, and instructions for installing the gate (e.g., in accordance with methods discussed herein). The parts can have a protective coating to prevent wear, tear, and corrosion over time. The kit may include parts to improve safety during operation and installation of the manually operated gate. For instance, open ends of the lower arm, upper arm, proximal upright member, and distal upright member can be covered with end caps included in the kit. During installation, the finish can be preserved by laying parts on a protective surface such as cardboard which may be included in the kit. The kit can also include instructions and tools for operating, maintaining, installing, and/or training for the manually operated gate assembly.

Figure 11:
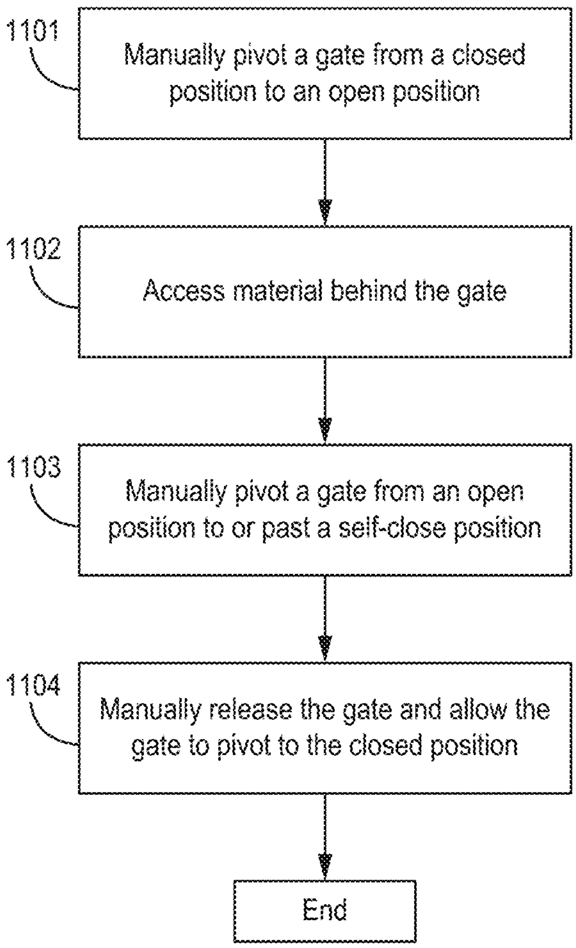
FIG. 11 is a flow diagram illustrating a method of using a manually operated gate.

FIG. 11 shows an illustrative method for using a manually operated gate. A method for using the gate can include manually pivoting a gate from a closed position to an open position 1101. The gate can be similar to those disclosed herein. Then, material behind the gate can be accessed 1102. The gate can be manually pivoted from the open position to or past a self-close position 1103. The spring assembly can dampen movement of the gate from the open position to the self-close position. The gate can be manually released at or past the self-close position and can be allowed to pivot to the closed position 1104.

Figure 12:
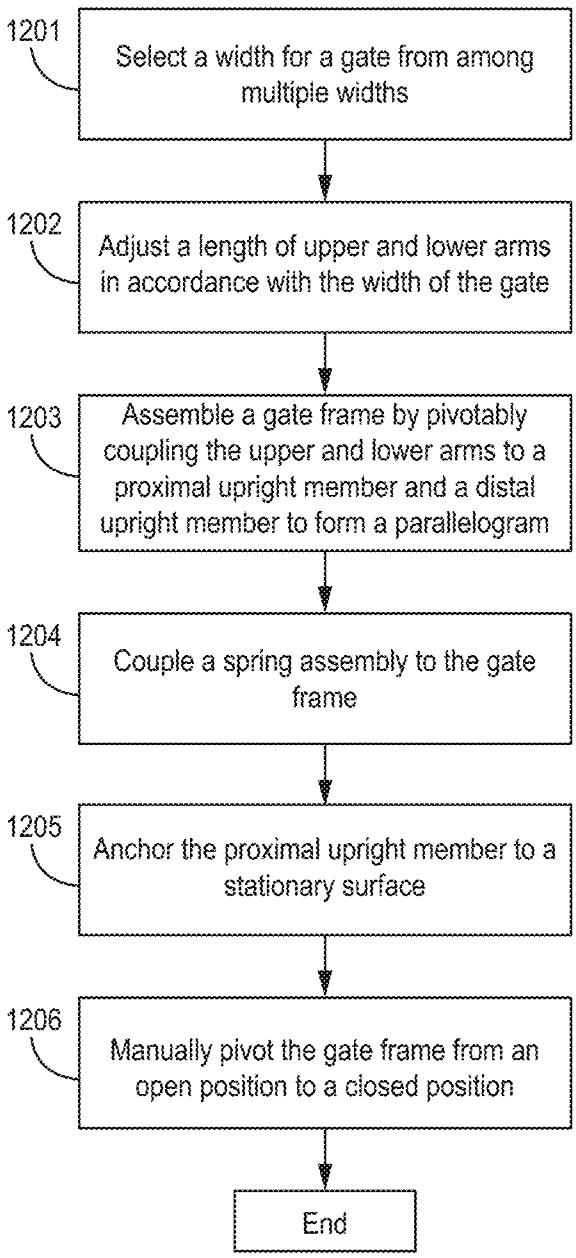
FIG. 12 is a flow diagram illustrating a method of installing a manually operated gate.

A method for installing a gate assembly is illustrated in FIG. 12. The method can include selecting a width for a gate from among multiple possible widths 1201, assembling the gate, and manually pivoting the gate. At least some of the multiple possible widths can include widths that accommodate standard sized openings in, for instance, truck loading and unloading docks (e.g., 8 feet, 10 feet, etc.). The gate can be assembled using a kit as described elsewhere herein. The gate can be configured to pivot at a constant angular velocity and/or to freely close when the gate is at a partially open position.

Assembling gate can include multiple steps. For instance, the length of the upper and lower arms can be adjusted in accordance with the width of the gate 1202. Assembling the gate can include assembling a gate frame by pivotably coupling the upper and lower arms to a proximal upright member and a distal upright member to form a parallelogram 1203. A spring assembly can then be coupled to the gate frame 1204. Assembling the gate can include anchoring the proximal upright member to a stationary surface 1205.

The method can further include manually pivoting the gate frame from an open position to a closed position 1206. In the open position, the upper and lower arms can be generally vertical. In the closed position, the upper and lower arms can be generally horizontal. The spring assembly can be configured to operate irrespective of which of the multiple possible widths is selected. The spring assembly can assist movement of the gate frame from the closed position to the open position.

Adjusting the length of the upper and lower arms can include adjusting a length of the upper overlap portion. Adjusting the length of the upper and lower arms can include adjusting the lower arm overlap portion. Adjusting the length of the upper and lower arms can include fastening the upper main arm and the upper arm extension together in the upper arm overlap portion by applying force directly to an outer surface of the upper main arm and to an opposed outer surface of the upper arm extension with an upper arm fastener. Adjusting the length of the upper and lower arms can include fastening the lower main arm and the lower arm extension together in the lower arm overlap portion by applying force directly to an outer surface of the lower main arm and to an opposed outer surface of the lower arm extension with a lower arm fastener.

The gate frame can include a spring assembly bracket. The spring assembly bracket can have an installation section. The spring assembly bracket can have an operation section. Coupling the spring assembly to the gate frame can include coupling a first end of the spring assembly to the installation section. Coupling the spring assembly to the gate frame can include causing the first end of the spring assembly to move to the operation section as a result of manually pivoting the gate frame from the open position to the closed position.

Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A manually operated gate comprising:

(a) a gate frame that includes a proximal upright member, an upper arm, a lower arm, and a distal upright member, the proximal upright member being anchored to a stationary surface, the upper arm and the lower arm being coupled to the proximal upright member and the distal upright member to form a parallelogram, the upper arm and the lower arm pivoting relative to the proximal upright member and the distal upright member as the gate frame moves between an open position in which the upper arm and the lower arm are generally vertical and a closed position in which the upper arm and the lower arm are generally horizontal; and (b) a spring assembly coupled to the gate frame, the spring assembly being positioned closer to the distal upright member than to the proximal upright member, the spring assembly configured to assist movement of the gate frame from the closed position to the open position and configured to hold the upper arm and the lower arm generally vertical when the gate frame is in the open position.

2. The manually operated gate of claim 1, wherein the upper arm includes an upper main arm and an upper arm extension, and wherein the lower arm includes a lower main arm and a lower arm extension.

3. The manually operated gate of claim 2, wherein the upper main arm and the lower main arm are coupled to the proximal upright member and the upper arm extension and the lower arm extension are coupled to the distal upright member.

4. The manually operated gate of claim 2, wherein the upper arm includes an upper arm overlap portion in which either the upper main arm fits within the upper arm extension or the upper arm extension fits within the upper main arm, and wherein the lower arm includes a lower arm overlap portion in which either the lower main arm fits within the lower arm extension or the lower arm extension fits within the lower main arm.

5. The manually operated gate of claim 4, wherein the gate frame further includes:

an upper arm fastener configured to fasten the upper main arm and the upper arm extension together in the upper arm overlap portion by applying force directly to an outer surface of the upper main arm and to an outer surface of the upper arm extension, and a lower arm fastener configured to fasten the lower main arm and the lower arm extension together in the lower arm overlap portion by applying force directly to an outer surface of the lower main arm and to an outer surface of the lower arm extension.

6. The manually operated gate of claim 2, wherein the upper arm and the lower arm are each adjustable to multiple widths.

7. The manually operated gate of claim 1, wherein the spring assembly is coupled to the lower arm and the distal upright member of the gate frame.

8. The manually operated gate of claim 1, wherein the spring assembly comprises a fluid spring.

9. The manually operated gate of claim 1, wherein the gate frame further includes a spring assembly bracket configured to be coupled to the spring assembly, the spring assembly bracket having an installation section and an operation section.

10. The manually operated gate of claim 1, further comprising: a gate catch anchored to the stationary surface and configured to receive the distal upright member when the gate frame is in the closed position.

11. The manually operated gate of claim 1, wherein the spring assembly comprises one or more gas springs.

12. The manually operated gate of claim 1, wherein the spring assembly comprises one or more hydraulic springs.

13. The manually operated gate of claim 1, wherein the spring assembly comprises one or more steel coil springs.

14. A manually operated gate comprising:

(a) a gate frame that includes a proximal upright member, an upper arm, a lower arm, and a distal upright member, the proximal upright member being anchored to a stationary surface, the upper arm and the lower arm being coupled to the proximal upright member and the distal upright member to form a parallelogram, the upper arm and the lower arm pivoting relative to the proximal upright member and the distal upright member as the gate frame moves between an open position in which the upper arm and the lower arm are generally vertical and a closed position in which the upper arm and the lower arm are generally horizontal; and (b) a spring assembly coupled to the gate frame, the spring assembly pivotably coupling the lower arm to the distal upright member of the gate frame, the spring assembly configured to assist movement of the gate frame from the closed position to the open position and configured to hold the upper arm and the lower arm generally vertical when the gate frame is in the open position.

15. A manually operated gate comprising:

(a) a gate frame that includes a proximal upright member, an upper arm, a lower arm, and a distal upright member, the proximal upright member being anchored to a stationary surface, the upper arm and the lower arm being coupled to the proximal upright member and the distal upright member to form a parallelogram, the upper arm and the lower arm pivoting relative to the proximal upright member and the distal upright member as the gate frame moves between an open position in which the upper arm and the lower arm are generally vertical and a closed position in which the upper arm and the lower arm are generally horizontal; and (b) a spring assembly coupled to the gate frame closer to the distal upright member than to the proximal upright member, the spring assembly configured to assist movement of the gate frame from the closed position to the open position and configured to hold the upper arm and the lower arm generally vertical when the gate frame is in the open position.

16. The manually operated gate of claim 15, wherein the spring assembly is coupled to the lower arm and the distal upright member of the gate frame.

17. The manually operated gate of claim 15, wherein the upper arm includes an upper main arm and an upper arm extension, and wherein the lower arm includes a lower main arm and a lower arm extension.

18. The manually operated gate of claim 17, wherein the upper main arm and the lower main arm are coupled to the proximal upright member and the upper arm extension and the lower arm extension are coupled to the distal upright member.

19. The manually operated gate of claim 17, wherein:

the upper arm includes an upper arm overlap portion in which either the upper main arm fits within the upper arm extension or the upper arm extension fits within the upper main arm, the lower arm includes a lower arm overlap portion in which either the lower main arm fits within the lower arm extension or the lower arm extension fits within the lower main arm, and the gate frame further includes:

an upper arm fastener configured to fasten the upper main arm and the upper arm extension together in the upper arm overlap portion by applying force directly to an outer surface of the upper main arm and to an outer surface of the upper arm extension, and a lower arm fastener configured to fasten the lower main arm and the lower arm extension together in the lower arm overlap portion by applying force directly to an outer surface of the lower main arm and to an outer surface of the lower arm extension.

20. The manually operated gate of claim 15, wherein the spring assembly comprises a gas spring, a hydraulic spring, or a steel coil spring.

21. The manually operated gate of claim 15, wherein the spring assembly comprises a pair of springs pivotably coupling the lower arm to the distal upright member of the gate frame.

* * * * *